Oct. 23, 1928.
E. R. BURTNETT
1,688,611
PISTON FOR CHARGE PUMPING CYLINDERS
Filed March 25, 1926
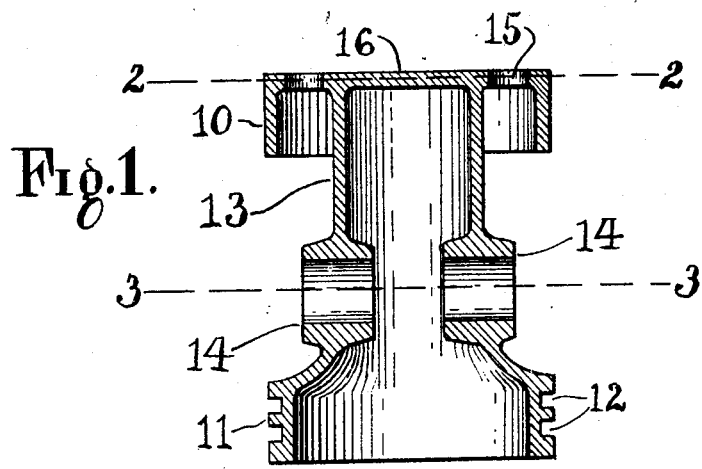
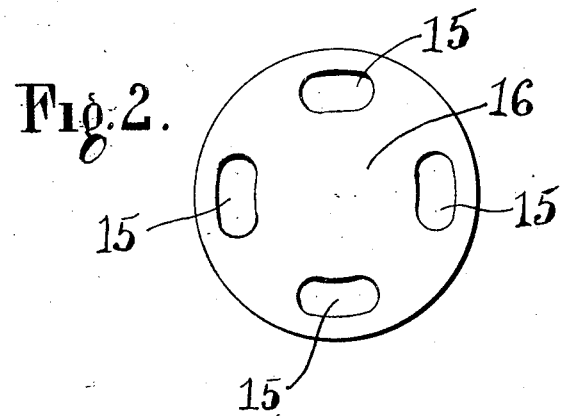
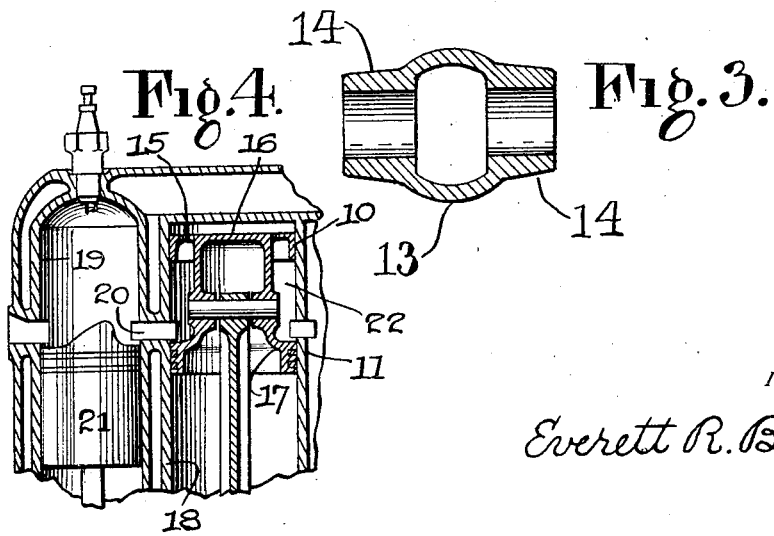
INVENTOR
Everett R. Burtnett Patented Oct. 23, 1928.

1,688,611

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CORPORATION, OF RENO, NEVADA, A CORPORATION.

PISTON FOR CHARGE-PUMPING CYLINDERS.

Application filed March 25, 1926. Serial No. 97,372.

My invention relates to internal combustion engines, and more particularly to pistons for charge pumping cylinders of two stroke cycle internal combustion engines, the principal object being to provide a piston which will be light in weight, of minimum friction surface in ratio to the displacement of stroke sweep, of a structure which will permit the passage of the cylinder contents over the exterior of its body to facilitate direct transfer of the pumped volume into the combustion chamber to which it is related.

In all cases of two stroke cycle internal combustion engines, a charge pump of some kind is necessary since the fresh charge must be inducted into the combustion chamber against atmospheric pressure and in some cases over atmospheric pressure.

The shorter and more direct the transfer passage between a given charge pumping chamber and a given related combustion chamber the greater will be the volumetric efficiency of volume transferred to the combustion chamber. My improved piston is of special advantage to two stroke cycle engines wherein the inlet to the combustion chamber is accomplished by charge transfer ports being arranged in the wall of the combustion cylinder at a point of the cylinder where the said ports will be wholly uncovered by the piston within the combustion cylinder only when the said piston within the combustion cylinder has reached crank end dead center.

With the foregoing and other objects in view, my invention consists in certain novel features of construction and form that will be hereinafter more fully described and claimed and illustrated in the accompanying drawings in which:

Fig. 1 is a vertical section taken through the center of my improved pumping cylinder piston the cutting line being taken in the plane of the axes of the wrist pin bosses.

Fig. 2 is a horizontal section taken on line 2—2 of Fig. 1.

Fig. 3 is a horizontal section taken on line 3—3 of Fig. 1.

Fig. 4 is a vertical section showing in partial form a combustion and charge pumping cylinder of an engine of the construction to which my invention is adapted.

Referring by numerals to the accompanying drawings, which illustrate a practical embodiment of my invention, 10 designates the head skirt of the piston, a crank end skirt 11 is provided with grooves 12 adapted to receive conventional packing rings of the expanding type, a cylindrical body 13 of less diameter than the head and crank end skirts 10 and 11 is formed as the central body of the member, wrist pin bosses 14 are formed in the central cylindrical body 13, openings 15 are formed through the head 16 for the passage of the cylinder contents from one side of the piston head 16 to the other.

The head end skirt 10 serves as a thrust guide to engage the cylinder wall, the crank end skirt 11 serves as a thrust guide to engage the cylinder wall and the packing ring grooves are formed in the crank end skirt 11 for the reason that the annular chamber formed between the skirts 10 and 11 and external of the central cylindrical body 13 is always in communication with the chamber headward of the piston head 16 by reason of the openings 15 in the said piston head, the application of the packing rings at this point prevents leakage between the crank case and the pump cylinder chamber. The charge pumping piston 17 is shown arranged for reciprocatory movement within a charge pumping cylinder 18, a combustion cylinder 19 is formed adjacent the charge pumping piston, a transfer port 20 is formed through the wall which wall separates the two cylinders, a piston 21 is arranged for reciprocatory movement within the combustion cylinder 19. The crankward movement of the piston 21 provides a passage communication between the transfer port 20 and the chamber within the combustion cylinder, at this moment the charge pumping piston 17 is in a position substantially at head end dead center, the transfer port 20 is in passage communication with the annular space 22 formed between the piston skirts 10 and 11, the charge volume compressed in the head end of the charge pumping cylinder before the head 16 of the charge pumping piston will be permitted to escape through the openings 15 formed in the head 16 of the piston 17 into the annular space 22 from which space the charge is transferred through the transfer port 20 into the combustion chamber. The construction of the charge pumping in the manner described provides the direct transfer of the pumped charge without the construction of passage ducts in the engine castings or cylinder block.

At the time the pump piston is moved headwardly on the compression stroke the charge within the cylinder headward of the piston will pass through the openings 15 in the head 16 of the piston into the annular chamber formed between the skirts 10 and 11 and it is from this annular chamber that the charge escapes when the transfer port registration between the pump cylinder and the combustion cylinder is established.

It will be understood that minor changes in the size and form of my improved piston may be made from that which is illustrated and described herein without departing from the spirit of the invention, the scope of which is set forth in the appended claims.

I claim as my invention:

1. In a piston a cylindrical central body, a head formed at one end of the said central cylindrical body, said head extending radially beyond the said central cylindrical body, a cylindrical extension formed around said head, there being apertures formed through the said head in an annular row between the circular line of the outer periphery of the central cylindrical body and the circular line of the inner side of the said cylindrical extension formed about said head, the end of said central cylindrical body opposite the end to which the head is formed extending radially outward, a crank end cylindrical skirt depending therefrom, there being packing ring grooves formed in the outer side of said crank end cylindrical skirt and wrist pin bosses formed in the body of the central cylindrical form.

2. A charge pump cylinder piston formed with two skirts, a central body, wrist pin bosses formed in said central body, a cross head enclosing the chamber within the central body at one end, said cross head extending radially outwardly beyond the outer line of said central body, a cylindrical skirt formed about said cross head, an annular outwardly extending cross head from the crank end of the central body, a cylindrical skirt formed about said annular outwardly extending cross head of the crank end, there being packing ring grooves formed in the outer face of said cylindrical skirt of the crank end, and there being apertures formed through the cross head of the member at a point of greater radius than the outer side of the said central body.

3. A piston having two skirts, packing ring grooves formed in the crank end skirt, a central hub, wrist pin bosses formed in the wall of said central hub, a cross head enclosing the head end of said central hub, said central hub being of less diameter than the two skirts, said cross head extending radially outwardly beyond the outer line of said central hub and supporting the head end skirt, openings formed through said cross head between the outer line of said central body and said head end skirt, and a crank end skirt formed as an outward cylindrical extension of the said central body.

4. A piston having a central body enclosed in its upper end, wrist pin supports arranged in said body, cylindrically finished guide surfaces at each end of the piston body, means for retaining expansion rings in the face of the guide surface at the crank end of the piston, the chamber within said central body of the piston being open only to the crank end when a wrist pin is secured in said wrist pin supports, said cylindrical guide surfaces being of greater diameter than the outer side of said central body and the space between the cylindrically formed guide surfaces of each end and the central body being open to the head end of the piston between the guide surface of the piston at the head end and said central body.

In testimony whereof, I herewith affix my signature.

EVERETT R. BURTNETT.